(12) United States Patent
Hager et al.

(10) Patent No.: US 6,759,783 B2
(45) Date of Patent: Jul. 6, 2004

(54) ELECTRIC MOTOR, IN PARTICULAR FOR RAISING AND LOWERING DISKS IN MOTOR VEHICLES

(75) Inventors: Martin Hager, Buehlertal (DE); Thomas Huck, Rheinmuenster (DE)

(73) Assignee: Robert Bosch GmbH, Stuttgart (DE)

( * ) Notice: Subject to any disclaimer, the term of this patent is extended or adjusted under 35 U.S.C. 154(b) by 38 days.

(21) Appl. No.: 10/030,872

(22) PCT Filed: Dec. 20, 2000

(86) PCT No.: PCT/DE01/04551
§ 371 (c)(1),
(2), (4) Date: May 15, 2002

(87) PCT Pub. No.: WO02/059843
PCT Pub. Date: Aug. 1, 2002

(65) Prior Publication Data
US 2002/0149283 A1 Oct. 17, 2002

(30) Foreign Application Priority Data
Feb. 19, 2000 (DE) .......................... 100 07 696

(51) Int. Cl.⁷ .............................................. H02K 13/00
(52) U.S. Cl. .................... 310/239; 310/67 R; 310/68 R
(58) Field of Search .............................. 310/68 R, 239, 310/67 R, 238

(56) References Cited

U.S. PATENT DOCUMENTS

| | | | | |
|---|---|---|---|---|
| 5,528,093 A | * | 6/1996 | Adam et al. ................. | 310/239 |
| 5,557,975 A | * | 9/1996 | Crane et al. ................. | 310/238 |
| 5,889,378 A | | 3/1999 | Hayashi ...................... | 439/76.1 |
| 5,942,819 A | * | 8/1999 | Burgess et al. ............. | 310/239 |
| 6,099,324 A | | 8/2000 | Janssen et al. ............ | 310/75 R |
| 6,127,752 A | * | 10/2000 | Wiesler ....................... | 310/239 |
| 6,163,096 A | * | 12/2000 | Michenfelder et al. ..... | 310/239 |
| 6,201,326 B1 | * | 3/2001 | Klappenbach et al. ...... | 310/239 |
| 6,252,938 B1 | * | 6/2001 | Tang ........................... | 378/154 |
| 6,481,550 B2 | * | 11/2002 | Yamamoto et al. ........... | 310/78 |
| 6,515,399 B1 | * | 2/2003 | Lauf et al. ................... | 310/239 |
| 6,525,938 B1 | * | 2/2003 | Chen .......................... | 361/695 |
| 6,555,943 B2 | * | 4/2003 | Walther et al. ............. | 310/239 |

FOREIGN PATENT DOCUMENTS

| | | | |
|---|---|---|---|
| DE | 40 05 709 A | 9/1991 | |
| DE | 40 05 709 A1 | 9/1991 | ........... H02K/11/00 |
| DE | 42 33 156 A | 4/1994 | |
| DE | 42 33 156 A1 | 4/1994 | .......... H02K/23/66 |
| DE | 43 15 404 A | 11/1994 | ............ H02K/5/14 |
| DE | 43 15 404 A1 | 11/1994 | ............ H02K/5/14 |
| EP | 0 474 904 B1 | 7/1994 | .......... H02K/23/66 |
| EP | 0 865 148 A | 9/1998 | |
| EP | 0 865 148 A1 | 9/1998 | .......... H02K/23/66 |

* cited by examiner

Primary Examiner—Thomas M. Dougherty
Assistant Examiner—Yahveh Comas
(74) Attorney, Agent, or Firm—Michael J. Striker

(57) ABSTRACT

Electric motor, in particular for raising and lowering panes in a motor vehicle having a transmission (11) and a transmission housing (10) and control electronics located in the transmission housing (10) such that the control electronics has precisely one essentially rectangular printed circuit board located in the transmission housing (10).

20 Claims, 5 Drawing Sheets

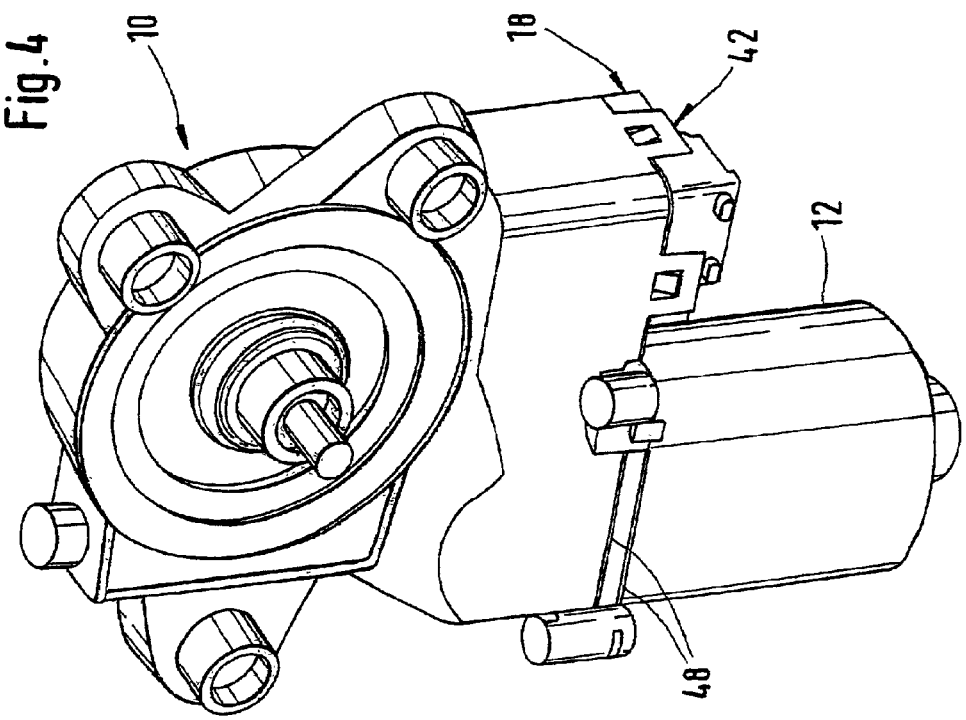
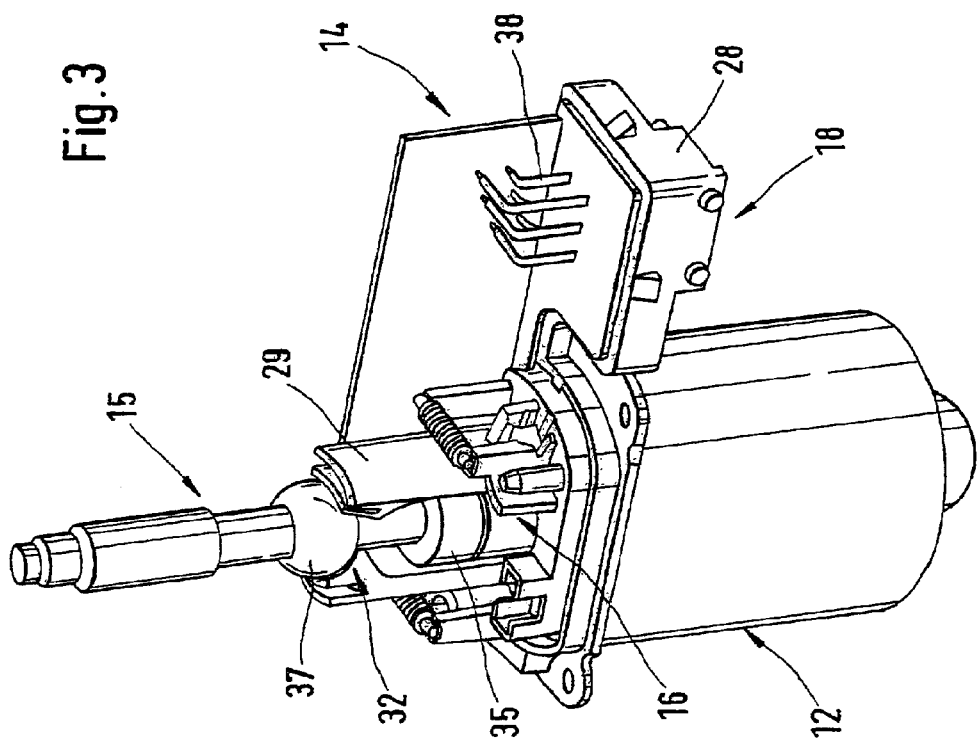

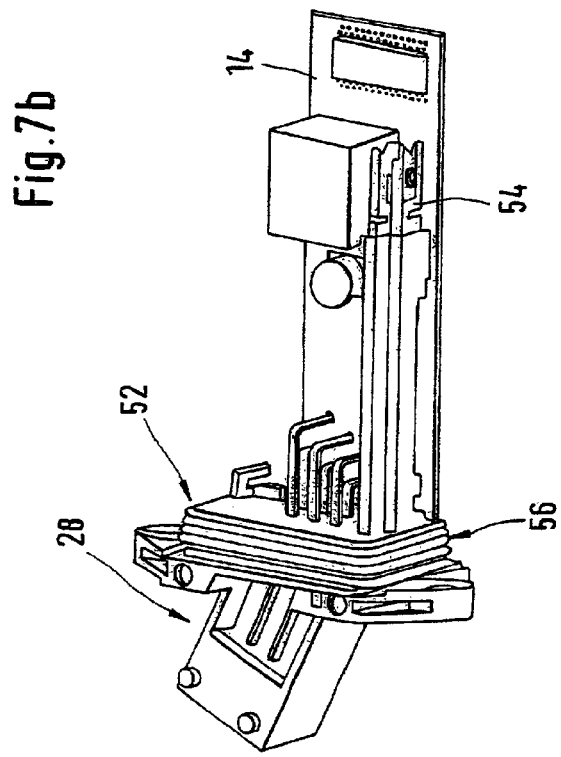
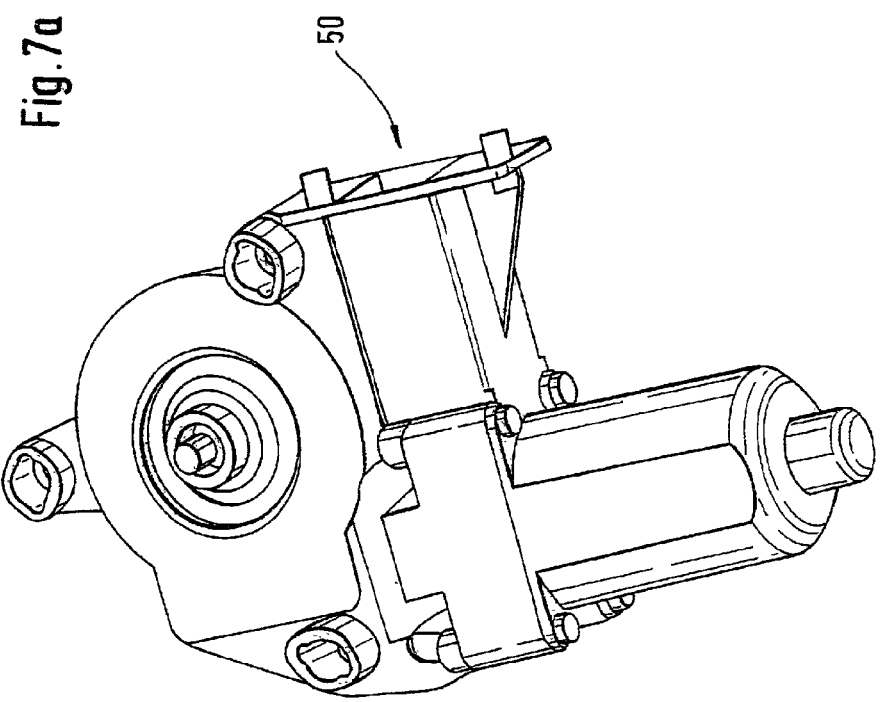

ELECTRIC MOTOR, IN PARTICULAR FOR RAISING AND LOWERING DISKS IN MOTOR VEHICLES

PRIOR ART

The invention pertains to an electric motor, in particular for raising and lowering panes in a motor vehicle according to the type of the independent claims. Numerous electric motors for this purpose are already known, for example from EP 0 474 904 B1. The electric motor shown in this patent document shows a transmission and integrated control electronics with a printed circuit board on which the commutator of the electric motor are located. Since the distance between the pole housing and the transmission housing in which the commutator of the electric motor is arranged is very short, the printed circuit board has an extension which guides the brushes of the electric motor to the commutator located on the armature shaft. This form is both cumbersome and expensive both from a manufacturing and an assembly perspective, in particular when Hall sensors need to be located in the area of the armature shaft for monitoring a transmission position.

ADVANTAGES OF THE INVENTION

The electric motor according to the invention having the distinguishing features of the main claim has the advantage that it is small and flat and in addition is compatible with a simple, essentially rectangular printed circuit board.

The features described in the dependent claims make possible advantageous further embodiments and improvements of the features according to the main claim.

If the electric motor has in addition a commutator extending over the pole housing, the brush holder can be directly connected mechanically and electrically with the connector plug, through the printed circuit board.

A groove in the brush holder for receiving the essentially rectangular printed circuit board represents an additional advantage, since this allows the printed circuit board to be precisely positioned. Due to this lack of tolerance channel connections for the plug and for the brushes can be brought directly to the printed circuit board.

A further advantage is if suppressors, which typically need to be located on the brushes, can be mounted directly on the printed circuit board.

If the printed circuit board having an ASIC (an Application-Specific Integrated Circuit) is equipped with an integrated Hall sensor, this has the advantage of replacing a number of the components and this also reducing cost.

It is particularly advantageous if the printed circuit board extends at least over the length of the commutator, especially if it extends beyond it by a factor of two or more. This leaves sufficient room for locating the electronic components of the control circuitry, especially depending on the required power.

If the brush holder carries a segment extending along an armature shaft, with this segment at its end at least is formed as a part of a bearing support, the armature shaft is rigidly held in place in the area of the commutator and in particular the distance between a transducer magnet located on the armature shaft and a Hall sensor located on the printed circuit board is kept constant.

By using holding elements for suppressors, the latter can be located in the area of the brushes with low vibrations, which has the advantage of increasing the life expectancy of the suppressors.

Particularly advantageous are arch or bridge shaped connecting bridges between the printed circuit board and the plug. In this way the connecting bridges are insensitive to the pulling and pressing forces that occur as a consequence of the mass inertia when the vehicle experiences vibrations. This ensures good contacting of the plug.

An additional advantage is provided when there are no conductor paths on the printed circuit board in the area of the brush sparking between the brushes and the commutator. These conductor paths would be easily damaged or corroded by spark discharges spraying in this area and the like.

If the printed circuit board is attached at at least one additional point besides the groove, the result is a stable connection between the printed circuit board and the brush holder.

If the suppressors are attached in holders on the brush holder, it is particularly advantageous to attach the printed circuit board using the attached suppressors. This enables easy and rapid installation of the printed circuit board.

It is particularly advantageous if the printed circuit board is held at segments also having a bearing receptacle for the armature shaft. This holds the distance between transducer magnets attached to the armature shaft and a Hall sensor mounted on the printed circuit board constant even during strong vibration.

A significant advantage can also be realized by the fact that the printed circuit board, especially when it is formed as a plug-in module, can be inserted into the transmission housing. This makes it easy to replace the control electronics. The term "control electronics", as commonly known, designates generally all components that serve for electrically controlling the electric motor. Such control electronics have a printed circuit board, which includes a concrete switching arrangement on a substrate.

If the connector plug is mechanically and electrically connected to the printed circuit board, a plug-in module having an integrated connector plug can be used, which significantly simplifies the contacting of the connector plug. This applies especially if clamping electrodes are used for contacting the brushes.

It is also advantageous to attach the plug or the plug-in module to the transmission housing using a flange connection. This ensures that the plug-in module is held securely, and makes it possible to use corresponding seals to easily make the assembly watertight.

DRAWINGS

The embodiments of the invention are shown in the drawings and explained in the following description.

FIG. 1b shows a schematically represented section along line b—b in FIG. 1a

Figure 2:
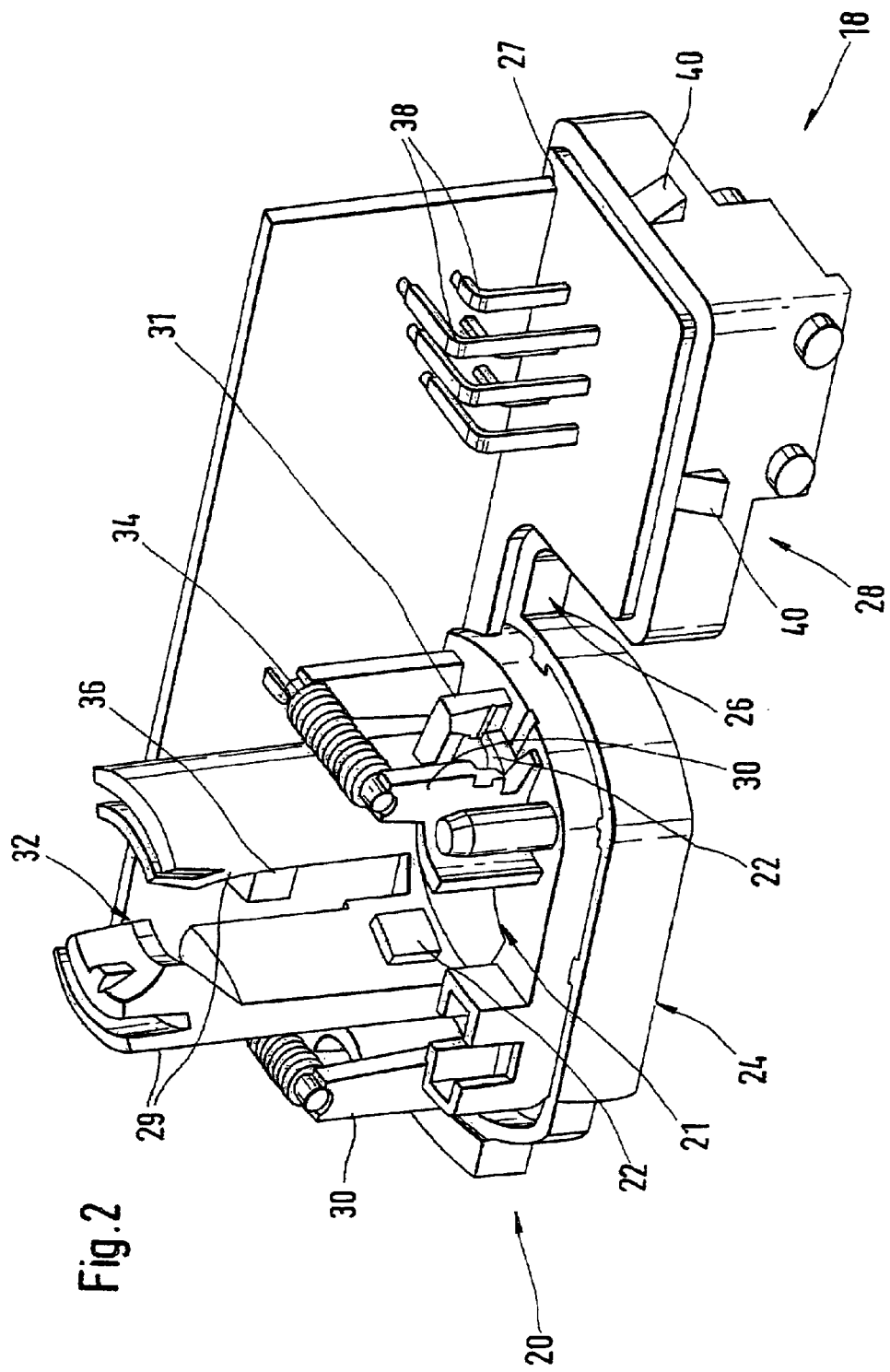
Figure 5:
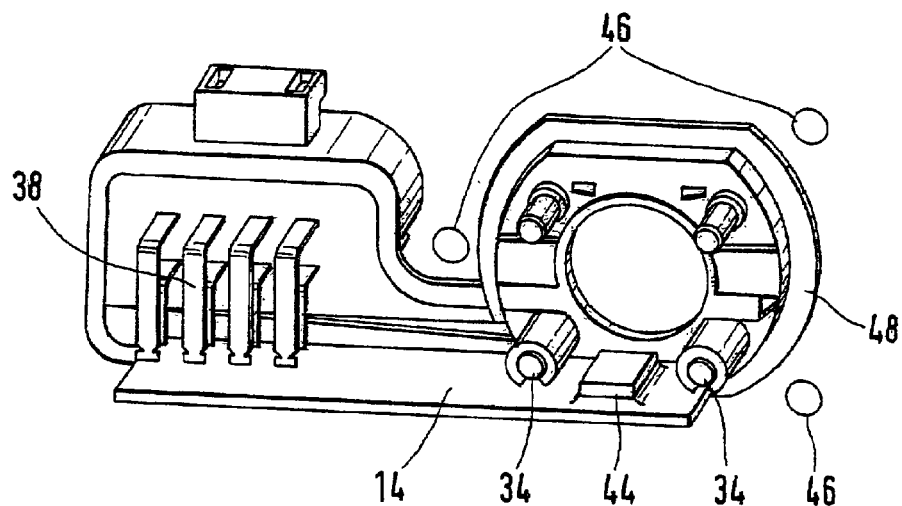
Figure 6A:
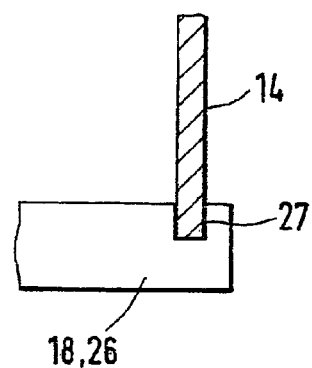
Figure 6B:
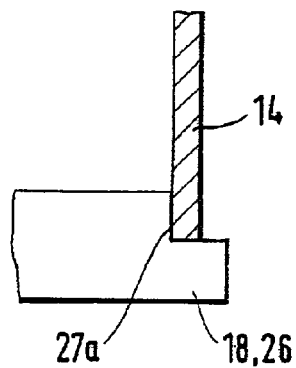

FIG. 2 shows a perspective representation of a brush holder plug combination with a printed circuit board FIG. 3 shows an electric motor having a brush holder/plug combination and board FIG. 4 shows a perspective representation of a complete motor with transmission, FIG. 5 shows a perspective representation of an additional embodiment of a brush holder, FIG. 6a shows a schematic representation a section through a cut-out of the web with printed circuit board, FIG. 6b shows a section through a cut-out of the web with printed circuit board in a variation of FIG. 6a, FIG. 7a shows a perspective representation of a complete electric motor in a variation having an exchange well, and FIG. 7b shows perspective representation of a printed circuit board with control electronics and plug.

DESCRIPTION OF THE EMBODIMENT

Figure 1B:
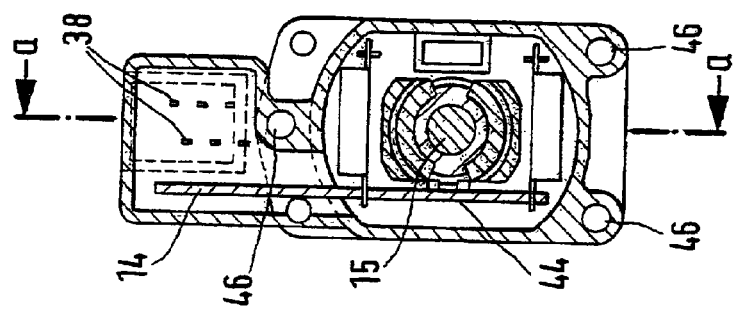
Figure 1A:
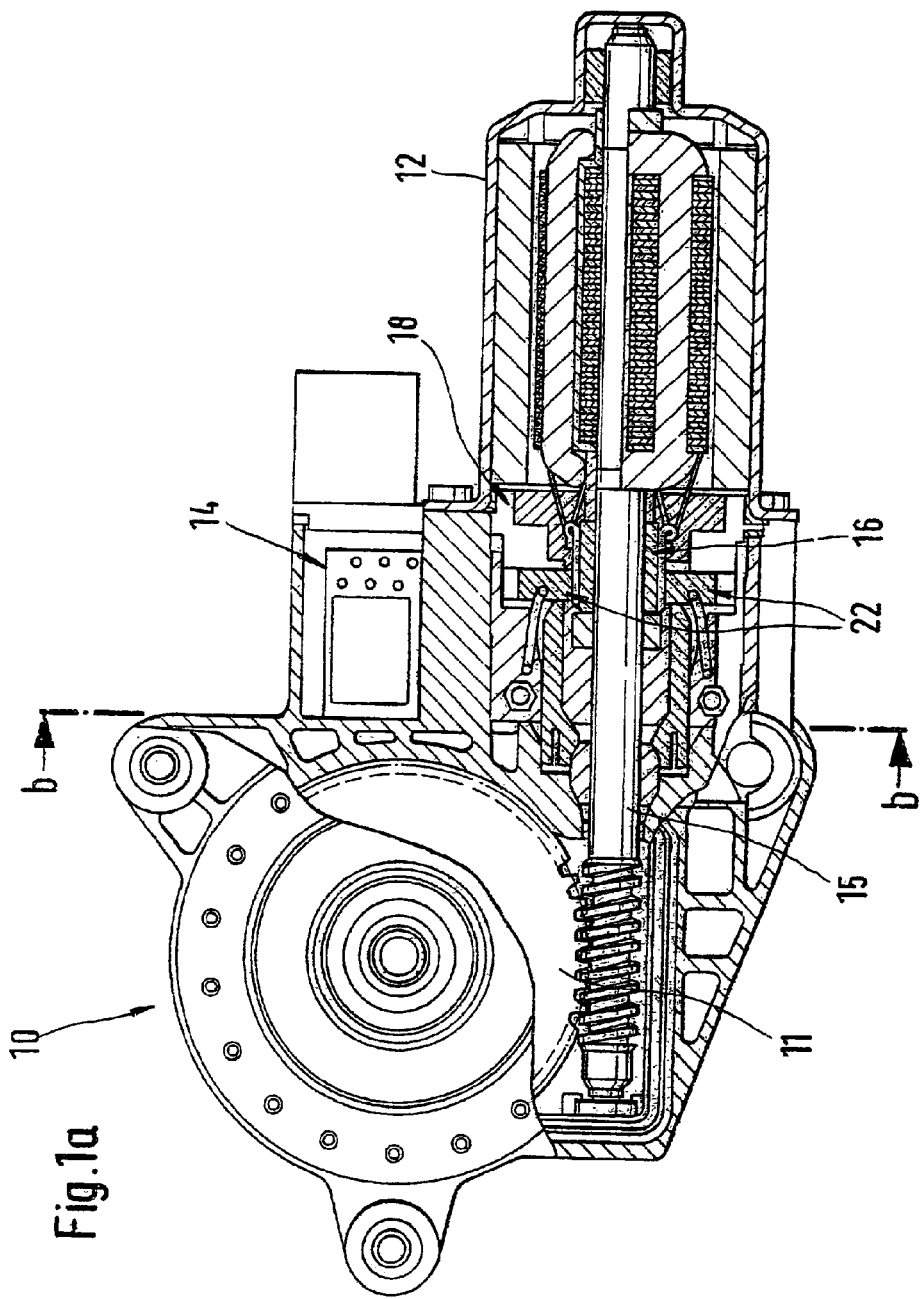
FIG. 1a shows a schematically represented partial section through an electric motor according to the invention along line a—a in FIG. 1b.

FIGS. 1a and 1b show an electric motor whereby an essentially rectangular printed circuit board 14 is arranged between a transmission housing 10 with a transmission 11 and a pole housing 12. To accomplish this the pole housing 12 was shortened so that a commutator 16 located on a armature shaft 15 extends out over the pole housing 12. A brush holder 18 which is held by the pole housing 12 and the transmission housing 10 carries brushes 22 which are engaged with the commutator 16.

FIG. 2 shows the brush holder 18 with the printed circuit board 14 in detail. The brush holder 18 has essentially three areas: one is an essentially round plastic ring 20 flattened on two opposite sides and held by the pole housing 12 and the transmission housing 10; one is a web 26 parallel to the flattened sides; and one is a connector plug 26 which is supported by the web 26. The inner recess of the plastic ring 20 is identified in the following with reference number 21. The brush holder includes a receptacle for holding the printed circuit board 14.

The plug direction of the connector plug 28 when installed is thereby perpendicular to the web 26 and parallel to the axis of the armature shaft 15. The printed circuit board 14 plugged into the brush holder 18 extends thereby from the plastic ring 20 over the web 26 to the connector plug 28 on the brush holder 18. All three areas, the plastic ring 20, the web 26 and the connector plug 28 have a continuous groove 27 (FIG. 6) in which the printed circuit board 14 is inserted pocket-like. The printed circuit board 14 thus sits firmly in the brush holder 18 and extends in a plane parallel to the armature shaft 15 between transmission 11 and pole housing 12.

The armature shaft 15, which supports the commutator 16, extends in the mounted condition through the inner recess 21 of the plastic ring 20. At the edge of the inner recess 21 of the plastic ring 20 there are two opposing segments 29 of a tall cylindrical ring, coaxial to the plastic ring 20. At their feet there are brush holders 31. At the other end of the segments 29, in other words at the end away from the plastic ring 20, these form a bearing receptacle 32 for a spherical bearing which supports the armature shaft 15.

The brushes 22 are arranged on the brush holders 31 at the base of the segments 29 such that they extend out from receptacles in the segments 29 in the direction of the commutator 16, and in particular can be pressed against the commutator 16 by means of springs not shown. The suppression elements 34 are also arranged in the direct vicinity of the brushes 22. These suppression elements are located on holders 30 arranged on the brush holder 18, extend parallel to the brush holder 18 and make direct contact with the printed circuit board 14.

The printed circuit board 14 can, since the brush holders 31 are arranged in the area of the segments 29, be brought very close to the armature shaft 15. The suppression elements 34 are located directly on the printed circuit board 14. As shown in the drawing, in particular the coils or capacitors that function as suppression elements 34 can extend vertically from the level of the printed circuit board 14. The printed circuit board 14 can thus be provided with components for the control electronics and suppression elements 34 in a single process, thus eliminating post-soldering of the noise suppression elements 34.

A transducer magnet 35 is also located on the armature shaft between the commutator 16 and the spherical bearing 37, which together with a Hall sensor 36 located on the printed circuit board 14 allows the position of the transmission 11 to be determined. The magnet transducer 35 consists of a hollow cylinder pressed for example onto the armature shaft 15, which cylinder is paired into multiple segments for various polarities. The Hall sensor 36 is in the form of an ASIC with an integrated Hall sensor located on the printed circuit board 14. Individual or dual Hall sensors are of course also possible.

The printed circuit board can be attached to a segment by means of adhesive or locking elements, for example. Since the printed circuit board 14 extends from the segments 29 to the connector plug 28, the connecting bridges 38 of the connector plug 28, which may also directly comprise the plug pins of the connector plug 28, are connected to the printed circuit board 14 directly or through a simple right-angle bend. This makes it possible to connect the connector plug 28 to the printed circuit board 14 without the use of cable. The connecting bridges 38 can thereby be connected for example to the printed circuit board either by soldering or being pressed in.

The outer surfaces of the brush holder 18 also have various fastening elements such as teeth 40 to simplify attachment of the transmission housing 10. Seals 48 can be located between the pole housing 12, transmission housing 10 and brush holder 18, with the seals for example either molded-on using a multi-component injection process, or formed as a separate sealing component.

FIG. 3 shows an electric motor with brush holder 18 and pole housing 12. The bearing sphere 37 is arranged on the armature shaft 15 in the bearing receptacle 32 at the upper end of segment 29. The magnet transducer 35 is positioned between commutator 16 and bearing receptacle 32. The armature shaft itself is held at its end opposite the rotor in a floating manner and by a slide or roller bearing at the rotor end.

FIG. 4 shows an electric motor with brush holder 18, pole housing 12 and transmission housing 10. The pole housing 12 and transmission housing 10 are joined using three fastening elements at three connection points 46. In addition the transmission housing 10 has clips 42 for connecting to the teeth 40 of the brush holder 18.

FIG. 5 shows a variation of the brush holder 18 with the connecting bridges 38, and the positions of the connection points 46 of the pole housing 12 with the transmission housing 10. These are arranged in the form of a somewhat isosceles triangle. On the side of the printed circuit board 14 facing the armature shaft 15 there is an ASIC 44 with an integrated Hall sensor. The suppression elements 34 are here arranged in a cylindrical shape of the brush holder 18 parallel to the armature shaft 15.

FIG. 6a shows a section from a cut through the web 26. The web 26 of the brush holder has a groove 27 into which the printed circuit board 14 is inserted. FIG. 6b shows a variation of this in which the web 26, instead of the groove 27, has a stop 27a to provide arresting of the printed circuit board 14.

FIG. 7a shows a variation of an electric motor according to the invention. The brush holder 18 cannot be seen here and does not have a web 26 with connector plug 28. Instead, the transmission housing 10 has an opening 50 in its side into which a rectangular printed circuit board 14 with control electronics can be inserted.

As shown in FIG. 7b, the connector plug 28 is attached to the printed circuit board 14 on one side through a connecting flange 52. To connect with the brushes 22 (FIG. 2) or the suppression elements 34, the printed circuit board 14 has clamping electrodes 54 which are engaged when sliding the printed circuit board 14 into the opening 50 (FIG. 7a) using the corresponding counter contacts—for example on the brush holder. When inserting the printed circuit board 14, it may for example be slid into the correct position using a groove not shown here and/or corresponding positive stops in the transmission housing 10, and so fixed in the intended position.

When installed, the connecting flange 52 closes off the transmission housing using corresponding flange seals 56. The flange connection may be accomplished using screws or clips.

What is claimed is:

1. Electric motor, in particular, for raising and lowering panes in a motor vehicle, with a transmission (11), a transmission housing (10), an armature shaft accommodated in the transmission housing, a brush holder (10) with a plastic ring (20), wherein the armature shaft projects through the plastic ring (20), and control electronics located in the transmission housing (10), characterized in that the control electronics comprises at least one printed circuit board (14) located in the transmission housing (10), wherein said at least one printed circuit board is essentially rectangular, wherein said printed circuit board is separate from the brush holder (18) and is formed to be removable from the brush holder (18), and wherein the printed circuit board extends in a plane parallel to the armature shaft (15).

2. Electric motor according to claim 1, wherein the electric motor has a pole housing (12) and a commutator (16) and that the commutator (16) extends out over the pole housing (12).

3. Electric motor according to claim 1, wherein brush holder (18) is provided with a groove (27) or a positive stop (27a) for receiving the printed circuit board (14).

4. Electric motor according to claim 1, wherein suppression elements (34) are provided and that they are located directly on the printed circuit board (14).

5. Electric motor according to claim 1, wherein the printed circuit board (14) can be provided with at least one Application-Specific Integrated Circuit (44) having integrated Hall sensors.

6. Electric motor according to claim 3, wherein the brush holder has connection bridges (38) which can be used as plug pins.

7. Electric motor according to claim 1, wherein a pole housing is provided which is joined with the transmission housing (10) using three screws.

8. Electric motor according to claim 1, wherein the printed circuit board (14) extends at least over the axial length of the commutator (16).

9. Electric motor according to claim 1, wherein the brush holder (18) supports at least one segment (29) along an armature shaft (15), and wherein this segment extends beyond the printed circuit board (14) and at its end forms at least part of a bearing receptacle (32).

10. Electric motor according to claim 1, wherein the brush holder (18) has holding elements (30) for suppression elements (34).

11. Electric motor according to claim 1, wherein the brush holder (18) has a connector plug (28) which is attached to the printed circuit board (14) using arch or bridge shaped connection bridges (38).

12. Electric motor according to claim 1, wherein the printed circuit board (14) has no conductor paths in the area of the brush sparking on a commutator (16), in particular, on the side facing the commutator (16).

13. Electric motor according to claim 1, wherein at least one additional fastening device besides a groove (27) on the brush holder (18) is provided.

14. Electric motor according to claim 13, wherein the at least one additional attachment of the printed circuit board (14) is by means of suppression elements (34).

15. Electric motor according to claim 13, wherein the printed circuit board (14) is attached on a segment (29).

16. Electric motor according to claim 1, wherein the essentially rectangular printed circuit board (14) can be inserted into an opening (50) on the transmission housing (10).

17. Electric motor according to claim 1, wherein the printed circuit board (14) is connected to a connection plug (28).

18. Electric motor according to claim 17, wherein a flange connection (52) for connecting the connection plug (28) to the transmission housing (10) is provided.

19. Electric motor, in particular, for raising and lower the windows of a motor vehicle, with a transmission (11), a transmission housing (10), an armature shaft (15) accommodated in the transmission housing (10), a brush holder (18) with a plastic ring (20), wherein the armature shaft (15) projects through the plastic ring, wherein a commutator (16) is arranged on the armature shaft (15), and a control electronics arranged in the transmission housing (10), characterized in that the control electronics have an essentially rectangular printed circuit board (14) arranged in the transmission housing (10), wherein the printed circuit board (14) extends over an axial length of the commutator (16) and extends beyond the axial length of the commutator (16) by at least 1.5 times.

20. Electric motor, in particular, for raising and lowering of windows of a motor vehicle, with a transmission (11), a transmission housing (10), an armature shaft (15) accommodated in the transmission housing (10), a brush holder (18) with a plastic ring (20), wherein the armature projects through the plastic ring (10), wherein a commutator (16) is arranged on the armature shaft (15), and a control electronics arranged in the transmission housing (10), characterized in that the control electronics has a printed circuit board (14) arranged in the transmission housing (10), wherein the printed circuit board (14) extends over the axial length of the commutator (16) and extends beyond the axial length of the commutator (16) by at least 1.5 times, and wherein the printed circuit board (14) can be inserted in an opening of the transmission housing (10) that is radial to the armature shaft (15).

* * * * *